United States Patent [19]

Prigge

[11] Patent Number: 4,904,492
[45] Date of Patent: Feb. 27, 1990

[54] METHOD FOR COOKING PIZZA
[75] Inventor: George W. Prigge, Reno, Nev.
[73] Assignee: Wells Manufacturing Company, Verdi, Nev.
[21] Appl. No.: 201,422
[22] Filed: Jun. 2, 1988
[51] Int. Cl.$^4$ ............................................. A21D 8/06
[52] U.S. Cl. ................................... 426/523; 426/505
[58] Field of Search .................. 426/523, 505; 99/450, 99/DIG. 15; 126/273.5, 400

[56] References Cited

U.S. PATENT DOCUMENTS 2,570,060 10/1951 Johnson ......................... 99/DIG. 15
3,548,736 12/1970 Wahl ..................................... 99/450
4,065,583 12/1977 Ahlgren ............................... 426/505
4,291,616 9/1981 Taylor ..................................... 99/450
4,731,252 3/1988 Duncan ............................... 426/523

Primary Examiner—George Yeung
Attorney, Agent, or Firm—Herbert C. Schulze

[57] ABSTRACT

A method and apparatus by which pizza can be cooked satisfactorily in an ordinary convection oven wherein a heat sink arrangement is made of a plate of metal or other heat retaining material with a cover of similar metal which rests flat against the heat sink, but which is perforated in such manner as to be able to satisfactorily cook the pizza but provide for the escape of steam under the pizza.

1 Claim, 2 Drawing Sheets

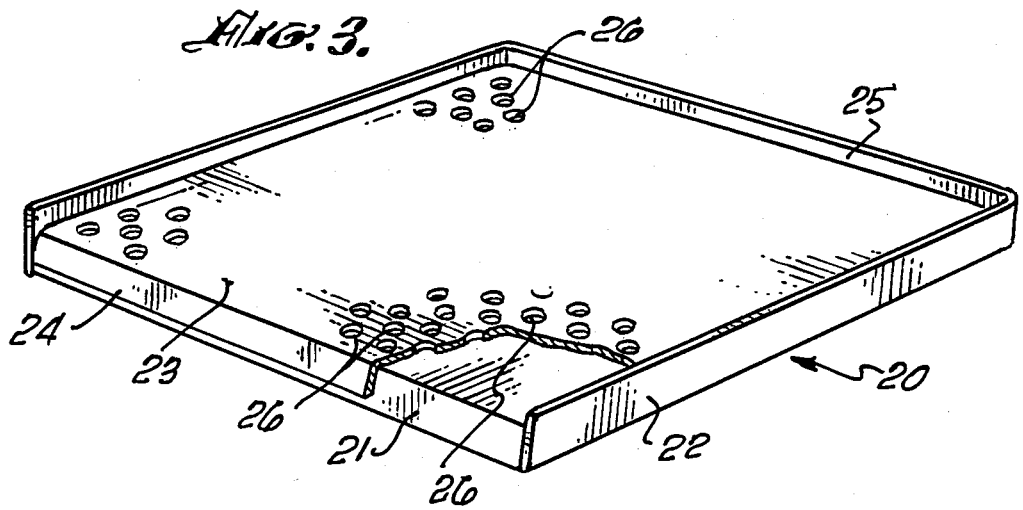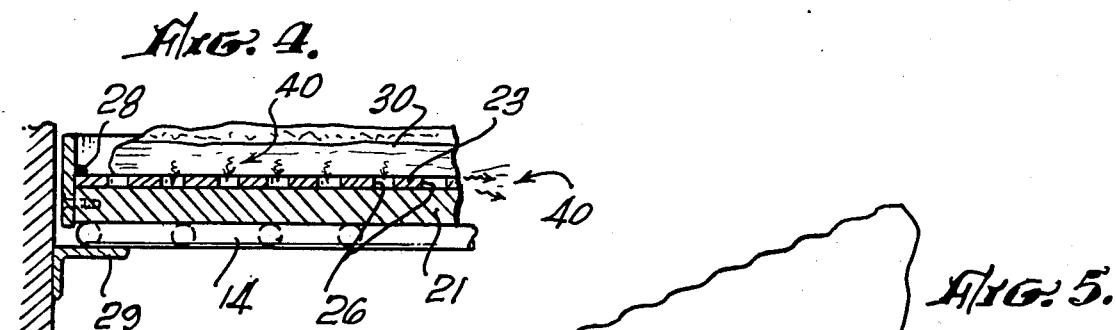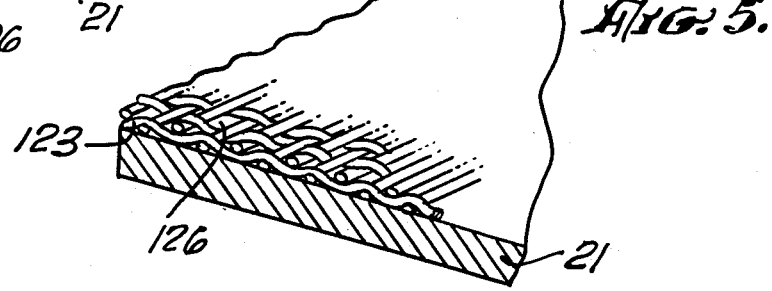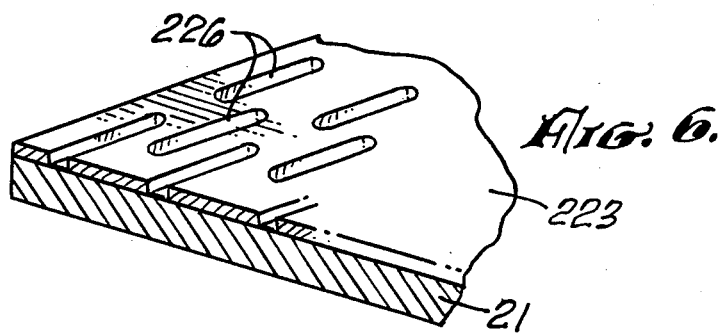

METHOD FOR COOKING PIZZA

CROSS REFERENCE TO RELATED PATENT APPLICATIONS

There is no other patent application filed by me related to this application.

BACKGROUND OF THE INVENTION

I. Field of the Invention

This invention is in the general field of method and apparatus for the cooking of pizza and is more particularly related to a method and apparatus for satisfactorily cooking pizza in an ordinary convection oven rather than in a special pizza oven; and is particularly related to an adaptor to place within the convection oven which will act as a heat retaining member but will at the same time allow for the escape of steam from beneath the pizza and across the heat retaining element.

II. Description of the Prior Art

The prior art in ovens for cooking pizza consist of specially constructed ovens having heat retaining ceramic or the like cooking platforms. Also some attempts have been made to use a plain block of metal within a convection oven for the cooking of pizza. The present invention is distinct from both of these prior arts in that a heat retaining metal element with a cooperative cover metal element which is perforated in such a manner as to allow steam to escape from beneath the pizza is used. There is no prior art known to me relating to such a combination.

SUMMARY OF THE INVENTION

Pizza has become one of the most popular of food items, particularly in fast food restaurants and the like throughout the United States and the World.

Pizza of course is formed of a crust with many ingredients on top of the crust, which combination is then cooked in special conditions, most frequently a special pizza oven, which oven will generally comprise a special heating oven with special heating trays of ceramic or similar material. In order for the pizza to be properly cooked it is necessary to use heavy traylike elements within the oven which will retain heat so as to primarily cook through and around the crust.

The crust is so made that a great deal of steam accumulates and escapes during the cooking process and the heavy trays of ceramic or the like allow the steam to simply escape.

For many years restaurants and the like have attempted to provide for some method of properly cooking pizza in an ordinary conventional convection oven. These efforts have generally failed. It is essential that a massive amount of heat be stored in the element upon which the pizza is cooked in the oven. Many persons have attempted to utilize a block of metal or the like resting upon a regular grid tray of a conventional convection oven, but these attempts fail to produce a quality product because steam tends to accumulate beneath the pizza causing a soggy end product which is not to the liking of the average person eating pizza.

There has been considerable thought devoted to this problem since many restaurants are equipped with convection ovens and not with pizza ovens, but until my invention no one has been able to solve this problem.

I have been able to solve the problem by providing a specially constructed element for placing upon the ordinary grid tray of a convection oven which is a combination of metallic elements (at this time preferably aluminum) wherein one element is a heavy aluminum plate which will accumulate and hold heat, and the other element is a cooperative relatively thin cover over said aluminum plate and in full contact therewith but which contains perforations so that steam may escape through the perforations and out between the perforated plate and the massive plate upon which it rests. The perforated plate can take many different forms, but it is essential that it remain in close contact with the underlying heat sink block of metal in order that it itself remains constantly heated to the proper temperature. In this manner, a proper base for the pizza is formed, yet its nature, is such that accumulating steam can escape from all portions under the pizza without leaving a soggy or distasteful article.

It is an object of this invention to provide a method and apparatus for practicing the method by which any ordinary convection oven can be adapted to properly cook pizza;

Another object of this invention is to provide such a method and apparatus as heretofore mentioned which is economical to manufacture;

Another object of this invention is to provide such a method and apparatus as described which can be easily inserted into a customary convection oven and easily removed therefrom.

The foregoing and other objects and advantages of this invention will become apparent to those skilled in the art upon reviewing the description of preferred embodiment which follows, in conjunction with a review of the appended drawings.

BRIEF DESCRIPTION OF THE DRAWINGS

FIG. 3 is an enlarged partially broken away perspective of the preferred embodiment of the apparatus to practice the method of this invention shown in FIG. 2;

FIG. 4 is a partially broken away partial section on an edge of the center shelf of FIG. 2 with a portion of the pizza in place;

FIG. 5 is a partially broken away partially sectioned perspective schematic view of an alternate embodiment of the apparatus to practice the method of this invention; and FIG. 6 is a view similar to FIG. 5 of another alternate embodiment of an apparatus to practice the method of this invention.

DESCRIPTION OF A PREFERRED EMBODIMENT

Figure 1:
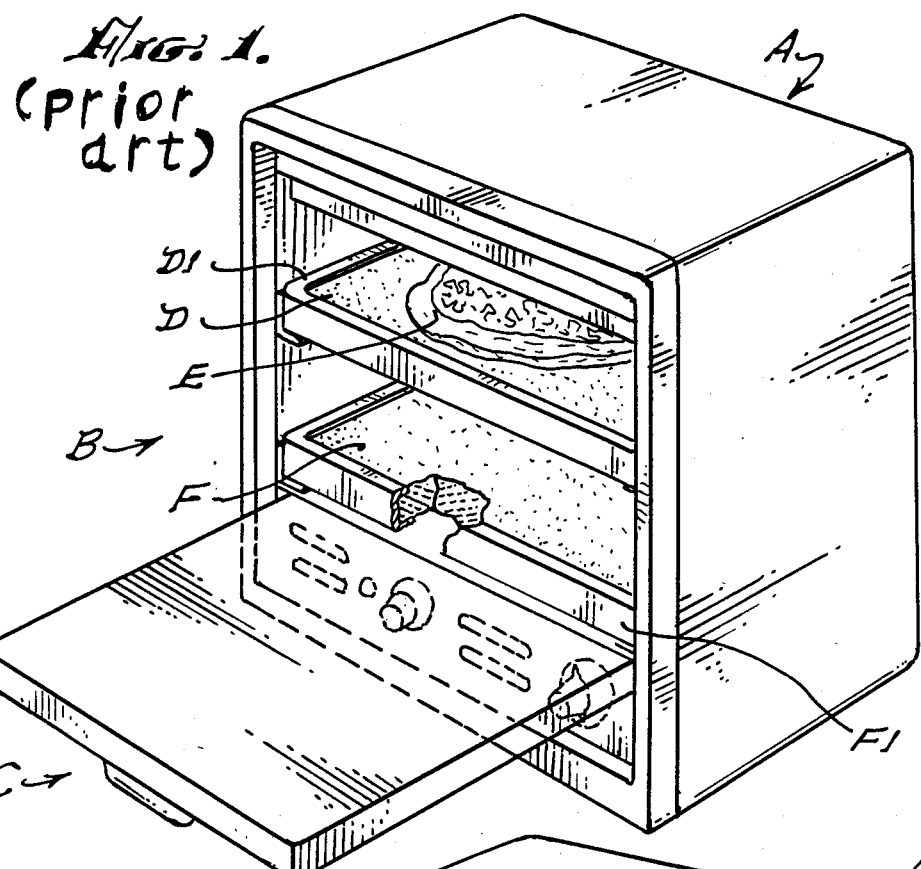
FIG. 1 illustrates in perspective, schematically and partially broken away a conventional pizza oven.

FIG. 1 illustrates generally a pizza oven A having an opening at B closeable by door C. The two trays illustrated are respectively D and F, each consisting of a ceramic material or the like suitable to hold and maintain a massive amount of heat, that they are sufficiently porous that steam from a pizza such as E is able to pass through and underneath, rather than accumulate beneath the pizza.

The ceramic D is generally surrounded by an appropriate metallic or the like liner D1 and likewise the ceramic F by suitable retaining edge F1. The reason for this type of tray is that it is necessary to have a solid heat retaining material which will retain massive amounts of heat for the proper cooking of the pizza E. However it is also necessary for the steam to escape which it can do through a porous underlying massive heat retaining element such as D.

Figure 2:
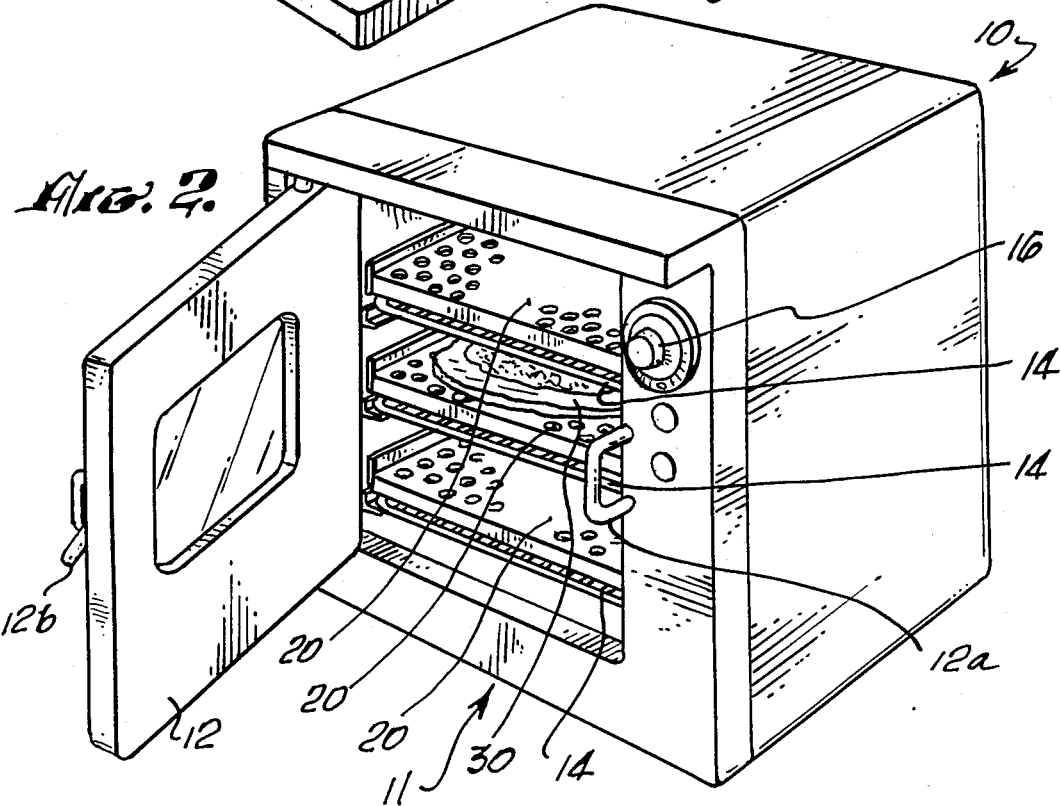
FIG. 2 illustrates in perspective, schematically a conventional convection oven with an apparatus to practice the method of this ivention in place.

In the case of a customary convection oven, slightly different problems are encountered. Such a convection oven is shown generally 10 in FIG. 2 having its oven space generally 11 and a closeable door 12. The door 12 will have suitable latching means 12a and 12b as indicated. Normally such an oven will have a control element 16.

Such an oven will also have a multiplicity of metallic grid like trays 14 upon which food and the like is generally placed.

A problem for cooking pizza in such an oven is that there is no element which retains and holds a massive amount of heat. This is necessary for the proper cooking of the pizza.

I have provided a series of heat retaining elements 20 for this purpose. A pizza 30 is shown in place on the intermediate element 20.

FIG. 3 illustrates in more detail the construction of the heat retaining element 20. It is seen that this consists of a massive block of aluminum or the like 21 with a thinner plate 23 having a lip 24 over the front and having a surrounding edge element 22 about the two sides and back of the heat retaining element 21. This creates an upstanding edge 25.

The surface of the element 23 will be smooth on both sides and it will be provided with numerous perforations 26 which can consist of holes or the like as shown.

At FIG. 4 it is shown that the upstanding edge 22 may be welded at 28 or otherwise formed so as to be intregal with the entire unit. This edge serves a dual purpose of holding the perforated plate 23 in place upon the heat retaining block 21 and to provide an edge around the element to prevent sauces and the like from flowing out over the element.

In FIG. 4 a pizza 30 is shown on the perforated plate 23. It will be noted that steam 40 is generated in the crust of the pizza and passes through the holes 26 and then escapes in a thin vapor between the plates 21 and 23. This perforated upper plate is the heart of the invention in that it is known people have attempted to use a block of aluminum or the like to retain heat for cooking pizza, but the same has been unsatisfactory because the pizzas have become soggy and unuseable. This is because the steam accumulates and cannot escape as it can in a normal pizza oven, as heretofore described.

FIG. 5 shows a potential use of a grid 123 over a block of aluminum 21 providing openings 126. If this embodiment is used it is more in the nature of a screen on top of the heat retaining element 21 and is not considered as effective although it will be better than having the pizza rest directly on the plate 21 because heat will escape and a considerable amount of the heat will be transferred in the proper manner to the pizza even though it is not in as direct contact as in the embodiment previously shown in FIG. 3.

FIG. 6 shows still an alternate embodiment which can be very effectively used wherein there can be a series of slots 226 through a thin upper plate 223 resting upon the plate 21. These slots will work very effectively to allow steam release, but can result in a less effective apparatus than the version shown in FIG. 3.

All the embodiments of this invention shown and described are fully capable of achieving the objects and advantages desired, it is to be understood that such have been shown for purposes of illustration only and not for purposes of limitation.

I claim:

1. The method of cooking pizza in a convection oven comprising: 1. mounting a first massive heat retaining element upon a grill work within a convection oven; 2. mounting a second thin heat conducting and retaining element having perforations through its thickness upon said first massive heat retaining element; 3. heating said convection oven until the said first massive heat retaining element and the said second thin heat conducting element are both at the appropriate temperature to cook a pizza; 4. placing an uncooked pizza upon the heated second thin heat conducting element, thereby generating steam on the underside of said pizza during cooking; 5. allowing said steam generated to pass through the perforations in said second thin heat retaining element and between said first heat retaining element and said second thin heat conducting element; and 6. removing said pizza when it has been cooked for a desired length of time.

* * * * *